United States Patent
Willey et al.

(10) Patent No.: US 9,259,802 B2
(45) Date of Patent: Feb. 16, 2016

(54) METHOD AND APPARATUS FOR COLLECTING MATERIAL PRODUCED BY PROCESSING WORKPIECES

(75) Inventors: Jeremy Alan Willey, Tualatin, OR (US); Steven Albert Supalla, Portland, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 566 days.

(21) Appl. No.: 13/558,571

(22) Filed: Jul. 26, 2012

(65) Prior Publication Data

US 2014/0026351 A1 Jan. 30, 2014

(51) Int. Cl.
*B23K 26/14* (2014.01)
*A47L 9/28* (2006.01)
*B08B 5/02* (2006.01)
*B08B 15/04* (2006.01)
*B23Q 11/00* (2006.01)

(52) U.S. Cl.
CPC ........... *B23K 26/1405* (2013.01); *A47L 9/2842* (2013.01); *A47L 9/2857* (2013.01); *B08B 5/02* (2013.01); *B08B 15/04* (2013.01); *B23K 26/1462* (2015.10); *B23Q 11/006* (2013.01)

(58) Field of Classification Search
CPC ....... A47L 9/2857; A47L 9/19; A47L 9/2842; A47L 9/02; A47L 9/2889; A47L 9/00; B23K 26/36; B23K 26/1405; B08B 5/02; B08B 15/04
USPC .......................... 15/300.1, 339, 345, 346, 347
See application file for complete search history.

(56) References Cited

U.S. PATENT DOCUMENTS

| | | | |
|---|---|---|---|
| 4,315,133 A | 2/1982 | Morgan et al. | |
| 4,361,957 A | 12/1982 | Krötz et al. | |
| 4,837,443 A * | 6/1989 | Young et al. | 250/440.11 |
| 4,897,520 A | 1/1990 | Carter et al. | |
| 5,780,806 A | 7/1998 | Ferguson et al. | |
| 5,906,760 A | 5/1999 | Robb et al. | |
| 5,925,024 A | 7/1999 | Joffe | |
| 5,973,764 A | 10/1999 | McCullough et al. | |
| 6,494,965 B1 | 12/2002 | Walker et al. | |
| 6,507,000 B2 | 1/2003 | Otsubo et al. | |
| 6,710,294 B2 | 3/2004 | Lawson | |
| 6,797,919 B1 | 9/2004 | Millard et al. | |
| 6,847,005 B2 | 1/2005 | Alfille | |
| 7,230,636 B2 | 6/2007 | Iwasa et al. | |
| 7,300,337 B1 | 11/2007 | Sun et al. | |
| 7,947,919 B2 | 5/2011 | Sukhman et al. | |

(Continued)

FOREIGN PATENT DOCUMENTS

| | | |
|---|---|---|
| GB | 2070493 A | 9/1981 |
| JP | 10-099978 A | 4/1998 |
| JP | 3143457 U | 7/2008 |

*Primary Examiner* — Robert Scruggs

(57) ABSTRACT

An apparatus for collecting material from a workpiece from a machined workpiece includes a fluid nozzle for inducing a flow of a fluid and a collection nozzle. The collection nozzle includes a motive nozzle for accelerating a first portion of the fluid flow; and an induced-suction nozzle for receiving a second portion of the fluid flow. A suction force can be generated within a vicinity of the induced-suction nozzle based on the accelerated first portion of the fluid flow. The suction force can be sufficient to carry at least a portion of the material away from the workpiece. Related methods of collecting material from a workpiece are also disclosed, as are systems capable of incorporating the material apparatus collecting apparatus.

23 Claims, 4 Drawing Sheets

(56) References Cited

U.S. PATENT DOCUMENTS

| | | |
|---|---|---|
| 8,207,472 B2 | 6/2012 | Kosmowski |
| 2002/0130115 A1 | 9/2002 | Lawson |
| 2002/0130116 A1 | 9/2002 | Lawson |
| 2004/0140300 A1 | 7/2004 | Yoshikawa |
| 2005/0061378 A1 | 3/2005 | Foret |
| 2007/0107252 A1 | 5/2007 | Kruckenhauser et al. |
| 2008/0041832 A1* | 2/2008 | Sykes et al. ............. 219/121.84 |
| 2008/0067160 A1 | 3/2008 | Suutarinen |
| 2008/0213978 A1 | 9/2008 | Henry et al. |
| 2010/0269853 A1 | 10/2010 | Johnston et al. |

* cited by examiner

METHOD AND APPARATUS FOR COLLECTING MATERIAL PRODUCED BY PROCESSING WORKPIECES

BACKGROUND

Embodiments of the present invention exemplarily described herein relate generally to methods and apparatuses for collecting material produced by processing workpieces.

Machines such as mechanical drills, mechanical saws, lathes, routers, sanders, abrasive blasters, laser drilling machines, laser cutting machines, laser milling machines, etc., are used to process (e.g., cut, drill, abrade, grind, remove, shape, mill, etc.) workpieces formed of metal, ceramic, glass, semiconductor material, and the like. By-products such as vapor, dust and larger debris are typically produced as a result of the interaction between the machine and the workpiece. Unabated, these by-products often become scattered on the surface workpiece, deposited on the machines used to machine the workpiece, or become entrained by ambient air currents. If not properly collected, such by-products can degrade the quality of the workpiece being machined, degrade the quality of the end-product to be produced as a result of machining the workpiece, contaminate or otherwise degrade the performance of the machine, and can degrade the overall air quality of the surrounding environment. For example, by-products produced as a result of machining with a laser-based system (e.g., a laser drilling machine, a laser cutting machine, a laser milling machine, etc.) can often be molten. If the molten materials are not adequately removed from the work area, these materials can undesirably adhere to the workpiece and to optics of the laser-based system, and can interfere with the laser-workpiece interaction.

SUMMARY

One embodiment described herein can be exemplarily characterized as an apparatus for collecting material from a workpiece produced as a result of machining the workpiece. In one embodiment, the apparatus can include a fluid nozzle configured to induce a flow of a fluid; and a collection nozzle configured to be disposed within the flow of the fluid. In one embodiment, the collection nozzle can include a motive nozzle configured to receive a first portion of the flow of the fluid and accelerate the received portion of the flow of the fluid to generate an accelerated flow of the fluid; an exhaust chamber configured to receive the accelerated flow of the fluid; a discharge outlet configured to exhaust the accelerated flow of the fluid from the exhaust chamber; and an induced-suction nozzle configured to receive a second portion of the flow of the fluid. The induced-suction nozzle can be in fluid communication with the exhaust chamber, the collection nozzle can be configured such that a suction force is transmittable from the exhaust chamber to a collection region within a vicinity of the induced-suction nozzle when the accelerated flow of fluid is exhausted from the exhaust chamber, and the collection nozzle can be configured such that the transmittable suction force is sufficient to carry at least a portion of the material away from the workpiece when the workpiece is operably proximate to the collection region.

Another embodiment described herein can be exemplarily characterized as a system for machining a workpiece. In one embodiment, the system can include a machine configured to machine a workpiece such that a material is producible as a result of machining the workpiece; and a fluid nozzle configured to induce a flow of a fluid into a process region through which the workpiece is accessible by the machine to be machined; and a collection nozzle adjacent to the process region. In one embodiment, the collection nozzle can include a motive nozzle configured to receive a first portion of the flow of the fluid and accelerate the received portion of the flow of the fluid to generate an accelerated flow of the fluid; an exhaust chamber configured to receive the accelerated flow of the fluid; a discharge outlet configured to exhaust the accelerated flow of the fluid from the exhaust chamber; and an induced-suction nozzle in fluid communication with the exhaust chamber. The collection nozzle can be configured such that a suction force is transmittable from the exhaust chamber to a collection region within a vicinity of the induced-suction nozzle when the accelerated flow of fluid is exhausted from the exhaust chamber, and the collection nozzle can be configured such that the transmittable suction force is sufficient to carry at least a portion of the material away from the workpiece when the workpiece is operably proximate to the collection region.

Yet another embodiment described herein can be exemplarily characterized as a method of machining a workpiece. In one embodiment, the method can include machining a workpiece such that a material is produced as a result of the machining; inducing a flow of a fluid; entraining the material within a first portion of the flow of the fluid; accelerating a second portion of the flow of the fluid to generate an accelerated flow of the fluid; generating a suction force based on the accelerated flow of the fluid; and transmitting the suction force to the first portion of the flow of the fluid to carry at least some of the material away from the workpiece.

DETAILED DESCRIPTION OF THE ILLUSTRATED EMBODIMENTS

Figure 1:
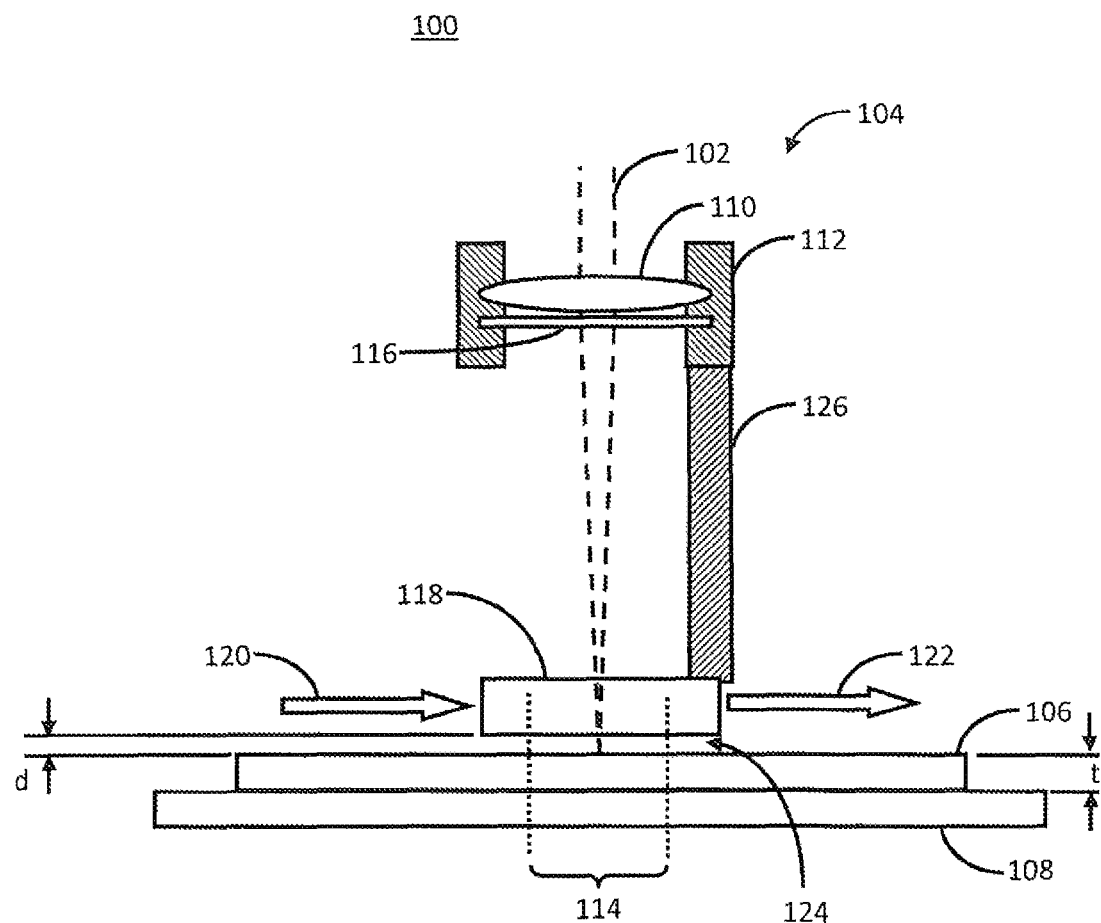
FIG. 1 schematically illustrates a workpiece machining system incorporating a material collection apparatus according to one embodiment of the present invention.

Exemplary embodiments of the present invention will be described more fully hereinafter with reference to the accompanying drawings. In these example embodiments, a workpiece is intended to be processed using a laser-based system as a machine to cut pieces out of the workpiece. It will be appreciated, however, that the Methods and apparatus described herein can be applied to process the workpiece in any manner to drill holes within the workpiece, separate the workpiece, mill the workpiece, or otherwise shape the workpiece in any other manner to form vias, holes, bores, slots, scribe lines, fiducial markers, etc., that extend fully or partially through the workpiece. It will also be appreciated that the methods and apparatus described herein can be used with other machines other than laser-based systems (e.g., mechanical drills, mechanical saws, lathes, routers, sanders, abrasive blasters, etc.). It will be appreciated that these embodiments may be altered and implemented in many other forms and should not be construed as limited to the discussion set forth herein. Rather, these embodiments are provided so that this disclosure will be thorough and complete, and will fully convey the scope of the invention to those skilled in the art. In the drawings, the sizes and relative sizes of layers and regions may be exaggerated for clarity.

The terminology used herein is for the purpose of describing particular example embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 schematically illustrates a workpiece machining system incorporating a material collection apparatus according to one embodiment of the present invention.

Referring to FIG. 1, a workpiece machining system, such as laser-based workpiece machining system 100, includes a laser source (not shown) configured generate a beam 102 of laser energy and a cutting head assembly 104 configured to direct the beam 102 along a cutting path and onto a workpiece 106 (e.g., secured to a chuck 108). The workpiece 106 may be of any suitable configuration. For example, the workpiece 106 may be a substrate such as a silicon (Si) wafer, a silicon-on-insulator (SOI) wafer, a gallium arsenide (GaAs) wafer, a sapphire wafer, etc., a printed circuit board (PCB), flexible printed circuit (FPC), a ceramic workpiece, a glass workpiece, a metal workpiece (e.g., plate, foil, etc.), a polymer workpiece, or the like or a combination thereof. The workpiece 106 may have a thickness, t, of less than 10 mm (e.g., less than 5 mm, less, than 2 mm, less than 1 mm, or the like). In other embodiments, however, thickness of the workpiece 106 may be larger than 10 mm.

As exemplarily illustrated, the cutting head assembly 104 includes a lens 110 mounted within a housing 112. The lens 110 is configured to focus the beam 102 such that the beam 102 illuminates a spot on the surface of the workpiece 106 having an intensity, fluence, power, etc., sufficient to ablate a portion of the workpiece 106. Although the cutting head assembly 104 is illustrated as including a single lens 110, a plurality of lenses may be implemented in any suitable manner. The beam 102 may be formed of a plurality of pulses of laser light having a wavelength in the ultra-violet (UV) range, visible range (e.g., green), or infrared (IR) range. Although not illustrated, the workpiece machining system 100 can also include a beam-steering system configured to scan the beam 102 through the lens 110 so that the beam 102 can be directed onto any portion of the workpiece 106 through a process region 114 of the cutting head assembly 104. In some embodiments, the beam-steering system can include one or more galvanometric mirrors or "galvo-mirros" (e.g., a X-axis galvo-mirror and/or a Y-axis galvo-mirror), one or more fast-steering mirrors (FSMs), one or more piezo-actuated mirrors, one or more acousto-optic deflectors (AODs), one or more electro-optic deflectors (EODs), or the like or a combination thereof. Although not illustrated, the workpiece machining system 100 can also include one or more motion control stages configured to move the chuck 108 in X-, Y- and/or Z-directions and, optionally, to rotate the chuck 108 (e.g., within the X-Y plane, along an axis extending along the Z-direction).

Constructed as exemplarily described above, the workpiece machining system 100 can be controlled in any suitable manner to direct a scannable, focused beam 102 of laser energy to ablate the workpiece 106 within the process region 114 and cut pieces or parts from the workpiece 106. After one region of the workpiece 106, exposed to the cutting head assembly 104 through the process region 114, is satisfactorily cut by the beam 102, the chuck 108 can be moved (e.g., by actuating one or more motion control stages) to expose another region of the workpiece 106 to the cutting head assembly 104 through the process region 114 and cut another region of the workpiece 106 with the beam 102. When the workpiece 106 is cut, by-product materials such as vapor (e.g., containing particles having a maximum cross-sectional dimension ranging from about 0.01 µm to about 4 µm), dust (e.g., containing particles having a maximum cross-sectional dimension ranging from about 0.1 µm to about 0.7 mm) and larger debris (e.g., containing particles having a maximum cross-sectional dimension ranging from about 0.8 µm to about 3 mm) are typically ejected from the workpiece 106 as a result of the interaction between the beam 102 and the workpiece 106. These ejected materials can be ejected into the process region 114 and deposited onto the cutting head assembly 104, thereby damaging lens 110 or obstructing the cutting path, which can reduce the ablation efficiency of the beam 102. Thus in one embodiment, the workpiece machining system 100 may include a protective window 116 that is at least substantially transparent to the beam 102 and that is configured to prevent the by-product from adhering to or otherwise damaging the lens 110. The protective window 116 can be periodically cleaned to remove deposited by-product materials or can be replaced entirely.

In addition, the aforementioned by-product materials can also become scattered on the surface of the workpiece 106, especially on the surface of the workpiece 106 adjacent to the process region 114. These scattered materials can adhere to the surface of the workpiece 106 and can degrade the quality of the pieces or parts ultimately cut from the workpiece 106 by the beam 102. Thus in another embodiment, the workpiece machining system 100 may include a material collection apparatus 118 configured to collect by-product materials produced as a result of cutting the workpiece 106. As will be discussed in greater detail below, the material collection apparatus 118 is configured to receive a fluid (e.g., as indicated by arrow 120), induce a flow of the fluid such that by-product materials within the process region 114 are entrainable by the flow, and discharge the entrained by-product materials (e.g., as indicated by arrow 122) outside the process region 114.

In the illustrated embodiment, the material collection apparatus 118 is coupled to the cutting head assembly 104 by a mount 126 to ensure that the material collection apparatus 118 is desirably or beneficially aligned with the process region 114. It will be appreciated, however, that the workpiece machining system 100 can be configured in any suitable matter to maintain alignment of the material collection apparatus 118 relative to the process region 114. As exemplarily illustrated, the material collection apparatus 118 is aligned relative to the process region 114 to form a gap 124 separating the material collection apparatus 118 and the workpiece 106 by a distance, d. In one embodiment, the distance, d, can be in a range from 0.5 mm to 2 mm. Depending on, for example, the presence or absence of features protruding from the surface of the workpiece 106 toward the workpiece machining system 100, the distance, d, may be less than 0.5 mm or greater than 2 mm.

Figure 2:
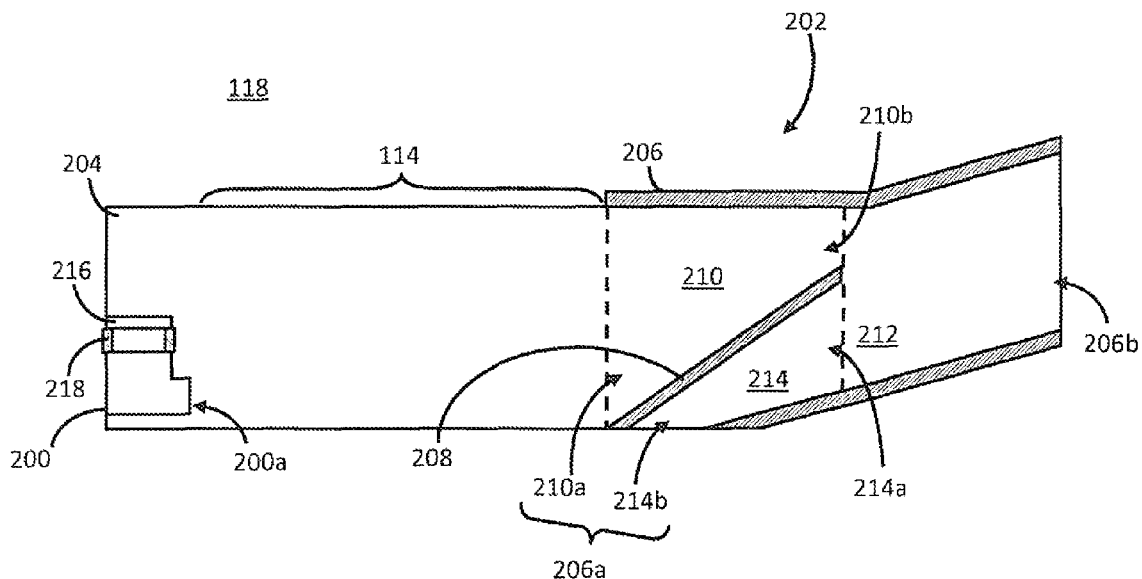
FIG. 2 is a side cross-sectional view of one embodiment of the material collection apparatus shown in FIG. 1.
Figure 3:
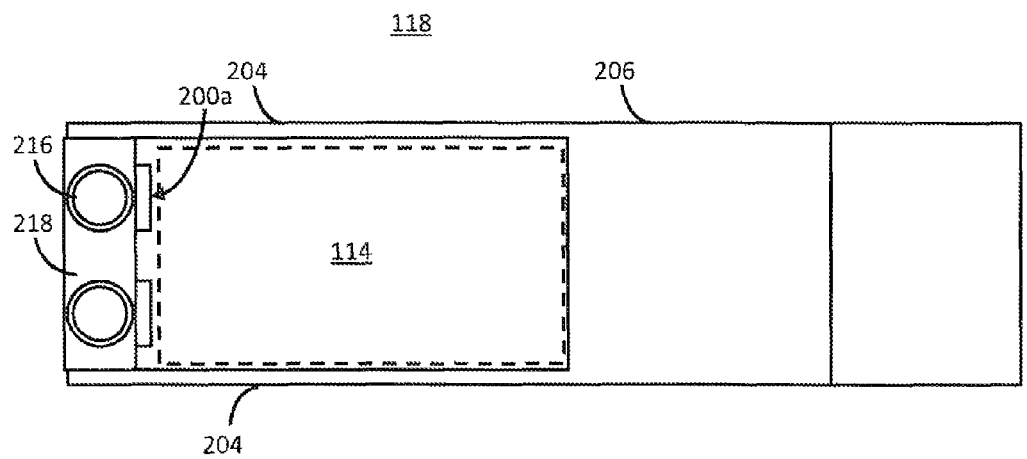
FIGS. 3 and 4 are top and bottom plan views, respectively, illustrating the material collection apparatus shown in FIG. 2.
Figure 4:
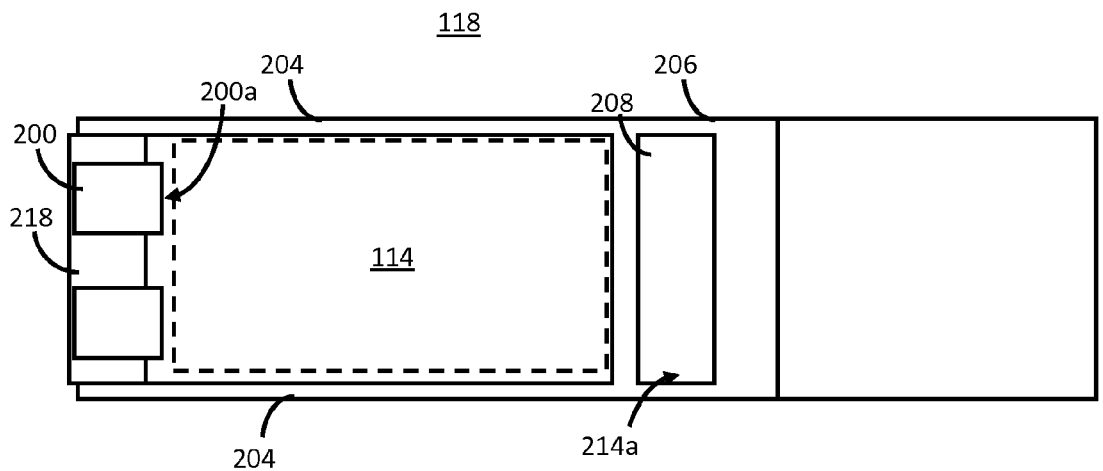
Figure 5:
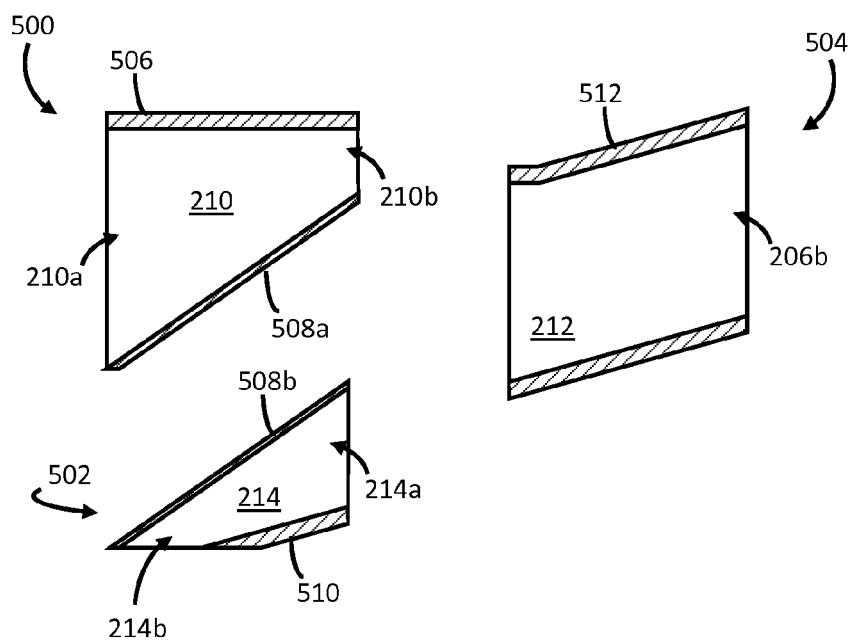
FIG. 5 is an exploded cross-sectional view schematically illustrating the collection nozzle shown in FIG. 2.

FIG. 2 is a side cross-sectional view of one embodiment of the material collection apparatus shown in FIG. 1. FIGS. 3 and 4 are top and bottom plan views, respectively, illustrating the material collection apparatus shown in FIG. 2. FIG. 5 is an exploded cross-sectional view schematically illustrating the collection nozzle shown in FIG. 2.

Referring to FIGS. 2 to 4, a material collection apparatus 118 may, according to one embodiment, includes a plurality of fluid nozzles 200, a collection nozzle 202 and, optionally, fences 204. Generally, the fluid nozzles 200 are configured to induce a flow of a fluid through the process region 114 and the collection nozzle 202 is configured collect by-product materials produced as a result of machining the workpiece 106. The fences 206 can be configured to guide the flow of the fluid from the fluid nozzle 200 to the collection nozzle 202. In another embodiment, the fences 204 can also be configured to confine entrained material within the process region 114. Similarly, although FIGS. 3 and 4 illustrate the material collection apparatus 118 as including two fences 204, it will be appreciated that the material collection apparatus 118 may be provided with more or fewer fences 204 depending upon the workpiece to be machined, how the workpiece will be machined, the particular configuration of the machine to be used, the level of material collection desired, and the like.

The fluid nozzle 200 includes a fluid outlet 200a that is configured to induce the flow of the fluid. In one embodiment, the fluid nozzle 200 is configured to induce a flow of a gaseous fluid (e.g., including air, oxygen, nitrogen, argon, helium, or the like or a combination thereof). In another embodiment, the fluid nozzle 200 is configured to induce a flow of a fluid with a sufficient mass flow rate to entrain by-product materials that have been ejected into the process region 114. Generally, what constitutes a sufficient mass flow rate can vary depending on the size of the process region 114. For example, a mass flow rate of 1 SCFM may be sufficient for a process region 114 having a size of about 20 mm×20 mm, and a mass flow rate of 4 SCFM may be sufficient for a process region 114 having a size of about 100 mm×100 mm.

The collection nozzle 202 includes a housing duct 206 and a deflector 208. The housing duct 206 includes a housing inlet 206a (e.g., a split or bifurcated inlet, etc.), a discharge outlet 206b and defines an interior space such that the housing inlet 206a fluidly communicates with the discharge outlet 206b. Generally, the housing inlet 206a is configured to receive fluid from the flow of the fluid induced by the nozzle 200, as well as by-product material that may be entrained by the flow of the fluid. The discharge outlet 206b can be configured to exhaust fluid and by-product materials. Although not illustrated, an auxiliary device such as a tube, a filter, gas absorbers, or the like or a combination thereof, may be coupled to the discharge outlet 206b to process, capture, etc., the fluid, the by-product materials, or the like or a combination thereof. A vacuum pump may be coupled to the discharge outlet 206b to aid in material collection at the collection nozzle, but this is not necessarily required.

The deflector 208 is coupled to the housing duct 206 and is structured to divide the interior space of the housing duct 206 into a motive fluid acceleration region 210, a depressurized region 212, and an induced-suction region 214. The fluid acceleration region 210 includes an inlet 210a for receiving a first portion of the flow of the fluid induced by the fluid nozzle 200. Within the fluid acceleration region 210, the first portion of the flow of the fluid induced by the nozzle 200 can be accelerated and discharged through an outlet 210b of the fluid acceleration region 210 into the depressurized region 212, where it is subsequently exhausted through the discharge outlet 206b. The induced-suction region 214 includes a suction outlet 214a in fluid communication with the depressurized region 212 and a suction inlet 214a configured to be placed operably proximate to the workpiece 106. The deflector 208 and housing duct 206 are configured such that, when the collection nozzle 200 is in the flow of the fluid, a static pressure within the depressurized region 212 is less than a static pressure within the induced-suction region 214. This difference in static pressures between the depressurized region 212 and the induced-suction region 214 creates a suction force that is transmittable from the depressurized region 212, sequentially through the suction outlet 214a, the induced-suction region 214 and the suction inlet 214b, and finally to a collection region (not shown) at the suction inlet 214b where by-product materials can be carried away from the workpiece 106 and into the induced-suction region 214 via the suction inlet 214b. Upon entering the induced-suction region 214, by-product materials can be discharged into the depressurized region 212 via the suction outlet 214a and, thereafter, discharged out the discharge outlet 206b.

Constructed as described above, and with reference to FIG. 5, the housing duct 206 and the deflector 208 can be conceptually divided into a motive nozzle 500 having the motive fluid acceleration region 210, an induced-suction nozzle 502 having the induced-suction region 214, and an exhaust chamber 504 having the depressurized region 212. As exemplarily illustrated, the motive nozzle 500 can include a first portion 506 of the housing duct 206 and a first portion 508a of the deflector 208. Similarly, the induced-suction nozzle 502 can include a second portion 510 of the housing duct 206 and a second portion 508b of the deflector 208. The exhaust chamber 504 can include a third portion 512 of the housing duct 206. As will be discussed in greater detail below, when the workpiece 106 is operably proximate to the material collection apparatus 118, the induced-suction nozzle 502 can be placed adjacent to the workpiece 106 such that by-product materials within the collection region at the suction inlet 214b can be removed from the workpiece 106. In the embodiment as exemplarily illustrated, the motive nozzle 500, induced-suction nozzle 502 and exhaust chamber 504 are integrally formed together as different portions of the same housing duct 206 and/or deflector 208. It will be appreciated however that one or more of the motive nozzle 500, induced-suction nozzle 502 and exhaust chamber 504 may be provided as separately-formed pieces configured for assembly together to form a collection nozzle.

Referring back to FIGS. 2 to 4, the material collection apparatus 118 may also include nozzle adapters 216 and a nozzle support beam 218. Each nozzle adapter 216 may be coupled to a corresponding nozzle 200 and may be configured to be coupled to a fluid source (not shown) such as a source of pressurized air. Accordingly, a nozzle adapter 216 can convey a fluid from a fluid source to a corresponding nozzle 200. The nozzle support beam 218 can extend from one or both fences 204 and include a plurality of openings formed therein. Each opening can be configured to be captured between a nozzle adapter 216 and a nozzle 200 that are coupled together. Thus, the nozzle support beam 218 can be configured to positionally fix the fluid nozzles 200 relative to the collection nozzle 202.

Figure 6:
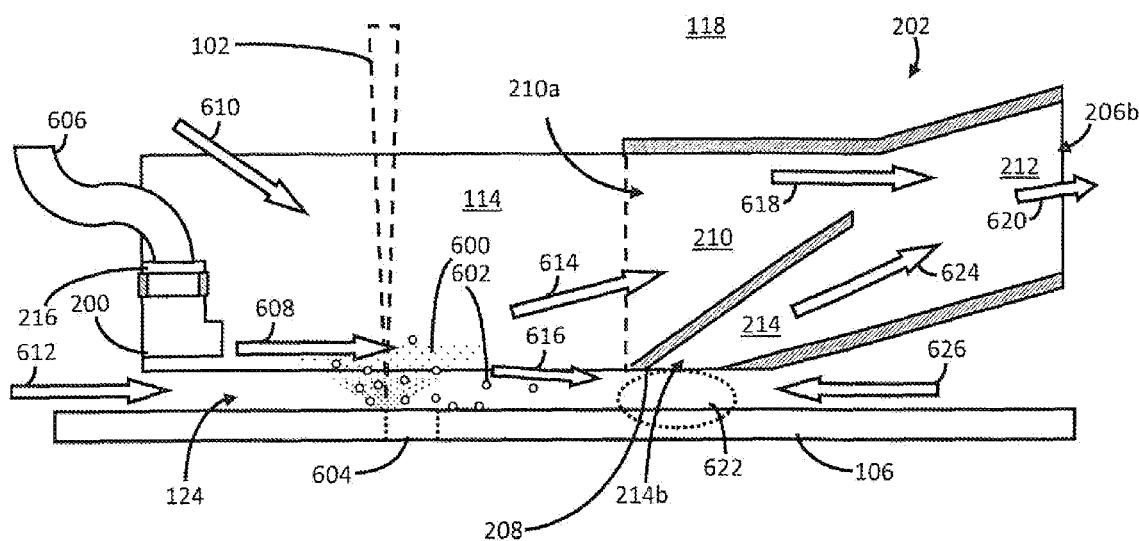
FIG. 6 is a side cross-sectional view schematically illustrating an operation of the material collection apparatus shown in FIG. 2.

FIG. 6 is a side cross-sectional view schematically illustrating an operation of the material collection apparatus shown in FIG. 2.

Referring to FIG. 6, a beam 102 of laser energy is directed from the cutting head assembly 104 onto the workpiece 106 to ablate a portion of the workpiece exposed to the cutting head assembly 104 within the process region 114. As a result of the interaction between the beam 102 and the workpiece 106, the aforementioned by-product materials such as vapor 600, as well as any dust and larger debris (generically identified at 602) are ejected generally upwardly from the workpiece 106. In the illustrated embodiment, the workpiece 106 has been ablated in a pattern resulting in the formation of a piece 604

(also referred to herein as "part material 604") that is separated from the bulk workpiece 106, but that has not been ejected from the workpiece 106. Part material 604 may be a desired part to be cut from the workpiece 106 (e.g., a part having some desired purpose or function in a subsequently-formed product, apparatus, or method), may be a fragment of the workpiece 106 incidentally remaining after a desired part has been cut from the workpiece 106 or after the workpiece 106 has been otherwise processed. In one embodiment, the part material 604 can be a fragment that is separated from the bulk workpiece 106 as a result of a laser trepanning process used to form a through-hole in the workpiece 106.

The nozzle adapter 216 is connected to fluid source (not shown), such as a source of pressurized air, via a hose 606. The fluid nozzle 200 received the fluid and, at the fluid outlet 200a, induces a flow of fluid (e.g., as indicated at arrow 608). The flow of the fluid 608 entrains by-product material (e.g., 600, 602, or the like or a combination thereof) and carries the entrained by-product material toward the collection nozzle 202. In one embodiment, the flow of the fluid 608 has a mass flow rate sufficient to entrain ambient air from outside the material collection apparatus 118 (e.g., as indicated by arrows 610 and 612). Consequently, the fluid nozzle 200 can be considered as inducing the ambient air flows 610 and 612 upon inducing the fluid flow 608. Ambient air flow 610 can help to prevent or minimize ejected by-product material 600 and 602 from escaping the material collection apparatus 118 at an upper portion of the process region 114. Similarly, ambient air flow 612 can help to prevent or minimize ejected by-product material 600 and 602 from escaping the material collection apparatus 118 at a lower portion of the process region 114. Generally, the ambient air flows 610 and 612 can mix with the fluid flow 608 as they travel toward the collection nozzle 202. Thus the flow of fluid within the process region 114 can generally be generically described as a flow of fluid, which includes a mixture of the fluid flow 608 and ambient air flows 610 and 612.

Upon approaching the collection nozzle 202, the flow of the fluid is divided (e.g., by the deflector 208) into a first portion 614 (also referred to herein as a "first divided fluid flow 614") and a second portion (also referred to herein as a "second divided fluid flow 616"). In general, the first divided fluid flow 614 is very large compared to the second divided fluid flow 616, which is choked by the gap 124 between the workpiece 106 and the deflector 208. If the gap 124 is too large, insufficiently low pressure is developed in the induced-suction region 214 and the collection nozzle 202 will not be able to collect by-product materials in a desirable manner. By-product materials 600 and 602 can be entrained by one or both of the first and second divided fluid flows 614 and 616. The first divided fluid flow 614 enters into the inlet 210a of the motive fluid acceleration region 210 (e.g., the motive nozzle 500 shown in FIG. 5) where it is accelerated to form an accelerated fluid flow 618. Subsequently, the accelerated fluid flow 618 is discharged into the depressurized region 212 (e.g., the exhaust chamber 504 shown in FIG. 5) and then through the discharge outlet 206b as discharged fluid flow 620. In one embodiment, by-product materials 600 and 602 that are entrained by the first divided fluid flow 614 can be discharged with the accelerated fluid flow 618 through the discharge outlet 206b. Due to the relatively high speed of the accelerated fluid flow 618 conveyed through the depressurized region 212 of the exhaust chamber 504, a suction force is generated and transmitted from the depressurized region 212, through the induced-suction region 214 of the induced-suction nozzle 502 to a collection region 620 at the suction inlet 214b. Fluid and by-product materials present within the collection region 620 (e.g., carried into the collection region 622 by the second divided fluid flow 616) can be carried away from the workpiece 106 and into the induced-suction region 214 via the suction inlet 214b along an induced-suctioned fluid flow 624. The induced-suctioned fluid flow 624 then enters into the depressurized region 212 of the exhaust chamber 504 where it mixes with the accelerated fluid flow 618 and is discharged through the discharge outlet 206b as the discharged fluid flow 620.

In one embodiment, the suction force transmitted to the collection region 620 is sufficient to draw in ambient air from outside the material collection apparatus 118 (e.g., as indicated by arrow 626). Ambient air flow 626 can help to prevent or minimize by-product material entrained by the second divided fluid flow 616 from escaping the material collection apparatus 118 at a lower portion of the process region 114 near collection nozzle 202. In another embodiment, the enhanced suction force transmitted to the collection region 620 is sufficient to remove the part material 604 from the workpiece 106. Thus, after forming the part material 604, the collection region 620 and the part material 604 can be aligned (e.g., the workpiece 106 can be moved, the material collection apparatus 118 can be moved, or a combination thereof) so that the part material 604 is exposed to the collection region 620. Upon being exposed to the collection region 620, the part material 604 can be carried away into the induced-suction region 214 and subsequently discharged (e.g., via the discharge outlet 206b).

The foregoing is illustrative of embodiments of the invention and is not to be construed as limiting thereof. Although a few example embodiments of the invention have been described, those skilled in the art will readily appreciate that many modifications are possible in the example embodiments without materially departing from the novel teachings and advantages of the invention. In view of the foregoing, it is to be understood that the foregoing is illustrative of the invention and is not to be construed as limited to the specific example embodiments of the invention disclosed, and that modifications to the disclosed example embodiments, as well as other embodiments, are intended to be included within the scope of the appended claims. The invention is defined by the following claims, with equivalents of the claims to be included therein.

What is claimed is:

1. An apparatus for collecting material from a workpiece produced as a result of machining the workpiece, the apparatus comprising:
   a fluid nozzle configured to induce a flow of a fluid; and
   a collection nozzle configured to be disposed within the flow of the fluid, the collection nozzle including:
      a motive nozzle configured to receive a first portion of the flow of the fluid and accelerate the received portion of the flow of the fluid to generate an accelerated flow of the fluid;
      an exhaust chamber configured to receive the accelerated flow of the fluid;
      a discharge outlet configured to exhaust the accelerated flow of the fluid from the exhaust chamber; and
      an induced-suction nozzle configured to receive a second portion of the flow of the fluid, wherein the induced-suction nozzle is in fluid communication with the exhaust chamber,
      wherein the collection nozzle is configured such that a first static pressure within the exhaust chamber is less than a second static pressure within the induced-suction nozzle when the accelerated flow of fluid is exhausted from the exhaust chamber, wherein the difference between the first and second static pressures is sufficient to generate a suction force transmittable from the exhaust chamber, through the induced-suction nozzle, to a collection region within a vicinity of the induced-suction nozzle, and wherein the collection nozzle is configured such that the transmittable suction force is sufficient to carry at least a portion of the material away from the workpiece when the workpiece is operably proximate to the collection region.

2. The apparatus of claim 1, wherein the fluid nozzle is configured to induce a flow of a gaseous fluid.

3. The apparatus of claim 2, wherein the fluid nozzle is configured to induce a flow of a gaseous fluid comprising air.

4. The apparatus of claim 1, wherein the fluid nozzle is configured to induce the flow of the fluid such that at least a portion of material produced as a result of machining the workpiece is entrainable by the induced flow of the fluid.

5. The apparatus of claim 4, wherein the motive nozzle is further configured to receive material entrained by the induced flow of the fluid.

6. The apparatus of claim 4, further comprising a fence at least partially encompassing a process region through which the workpiece is accessible to be machined by a machine, wherein the fence is configured to confine entrained material within the process region.

7. The apparatus of claim 6, wherein the fence is configured to guide the flow of the fluid toward the collection nozzle.

8. The apparatus of claim 6, wherein the fence is extends from the fluid nozzle to the collection nozzle.

9. The apparatus of claim 1, wherein the collection nozzle is configured such that the transmittable suction force is sufficient to draw, into the induced-suction nozzle, material having a maximum cross-sectional dimension greater than 0.01 µm.

10. The apparatus of claim 1, wherein the collection nozzle is configured such that the transmittable suction force is sufficient to draw, into the induced-suction nozzle, material having a maximum cross-sectional dimension less than 3 mm.

11. The apparatus of claim 1, wherein the induced-suction nozzle is further configured to convey material generated as a result of machining the workpiece into the exhaust chamber.

12. The apparatus of claim 11, wherein the discharge outlet is further configured to discharge the material conveyed into the exhaust chamber.

13. The apparatus of claim 1, wherein the motive nozzle, exhaust chamber and induced-suction nozzle are integrally formed together.

14. The apparatus of claim 1, further comprising a machine configured to machine the workpiece such that the material is producible,
wherein the fluid nozzle is configured to induce the flow of the fluid into a process region through which the workpiece is accessible by the machine to be machined, and
wherein the collection nozzle is adjacent to the process region.

15. The apparatus of claim 14, wherein the machine is a laser-based machining system configured to direct a beam of laser energy onto the workpiece, wherein the beam of laser energy is configured to remove a portion of the workpiece.

16. The apparatus of claim 14, wherein the machine fence is an abrasive blasting machine.

17. An apparatus for collecting material from a workpiece produced as a result of machining the workpiece, the apparatus comprising:
a fluid nozzle configured to induce a flow of a fluid;
a housing duct having a housing inlet and a discharge outlet, and defining an interior space in fluid communication with the housing inlet and the discharge outlet, wherein the housing inlet is configured to receive fluid and material entrained by the flow of the fluid and the discharge outlet is configured to discharge the received fluid; and
a deflector arranged within the interior space, the deflector dividing the interior space into a plurality of regions including:
a fluid acceleration region arranged to receive a portion of the flow of the fluid, the fluid acceleration region having a first portion and a second portion, wherein the second portion is smaller than the first portion and is closer to the discharge outlet than the first portion,
a suction region arranged to receive another portion of the flow of the fluid, the suction region having a third portion and a fourth portion, wherein the fourth portion is closer to the discharge outlet than the third portion, and
a fluid depressurization region located between the second portion of the fluid acceleration region and the discharge outlet and located between the fourth portion of the suction region and the discharge outlet,
wherein the housing duct and deflector are configured to generate a suction force at the third portion upon movement of a flow of the fluid from the second portion into the fluid depressurization region and discharge of fluid from the housing duct through the discharge outlet when the workpiece is operably proximate to the collection region.

18. The apparatus of claim 17, wherein the received material is dischargeable through the discharge outlet.

19. The apparatus of claim 17, wherein the deflector is coupled to the housing duct.

20. The apparatus of claim 17, wherein the apparatus does not include a vacuum pump in fluid communication with the discharge outlet.

21. A method of machining a workpiece, the method comprising:
machining a workpiece such that a material is produced as a result of the machining;
inducing a flow of a fluid;
entraining the material within a first portion of the flow of the fluid;
accelerating a second portion of the flow of the fluid to generate an accelerated flow of the fluid;
receiving, within an exhaust chamber, the accelerated flow of the fluid;
discharging the accelerated flow of the fluid from the exhaust chamber such that the exhaust chamber is at a first static pressure; and
transmitting, through an induced-suction nozzle in fluid communication with the exhaust chamber and having a second static pressure, a suction force to the first portion of the flow of the fluid to carry at least some of the material away from the workpiece, wherein the suction force is generated based on a difference between the first and second static pressures.

22. The method of claim 21, wherein machining the workpiece comprises directing a beam of laser energy onto the workpiece to machine the workpiece.

23. The method of claim 21, further comprising entraining the material within the second portion of the flow of the fluid.

* * * * *